United States Patent [19]

Gawrilow

[11] 4,226,894

[45] Oct. 7, 1980

[54] HYDRATED STABLE FLUENT SHORTENING CONTAINING SOLID PHASE EMULSIFIER COMPONENTS

[75] Inventor: Ilija Gawrilow, Strongsville, Ohio

[73] Assignee: SCM Corporation, New York, N.Y.

[21] Appl. No.: 959,728

[22] Filed: Nov. 13, 1978

Related U.S. Application Data

[63] Continuation-in-part of Ser. No. 747,296, Dec. 3, 1976, Pat. No. 4,137,338.

[51] Int. Cl.$^3$ .............................................. A23D 5/00
[52] U.S. Cl. ..................................... 426/606; 426/653
[58] Field of Search ................. 426/24, 601, 602, 606, 426/653, 654

[56] References Cited

U.S. PATENT DOCUMENTS

| | | | |
|---|---|---|---|
| 3,433,645 | 3/1969 | Egan et al. | 426/24 |
| 3,851,066 | 11/1974 | Langhans | 426/24 X |
| 3,906,117 | 9/1975 | Gawrilow | 426/602 X |
| 3,914,452 | 10/1975 | Norris | 426/601 X |
| 3,943,259 | 3/1976 | Norris | 426/24 |

*Primary Examiner*—Robert A. Yoncoskie
*Attorney, Agent, or Firm*—Richard H. Thomas

[57] ABSTRACT

An improved hydrated fluid shortening having a lipoidal content of about 25% to about 55% is prepared by emulsifying with about 75% to about 45% water, a shortening composition which contains about 40 to about 70 parts by weight of a liquid vegetable oil and about 8 to about 29 parts of an emulsifier concentrate, the latter consisting essentially of about 4 to about 10 parts normally liquid or soft partial glycerol ester food emulsifier vehicle in which is stably dispersed about 2 to about 8 parts ethoxylated fatty acid ester, about 2 to about 8 parts solid phase fine crystalline food emulsifier component, and about 0 to about 3 parts soybean stearine. In a preferred example of the present invention, the lipoidal emulsifier fraction comprises a fluent or soft mono- and diglyceride admixed with ethoxylated mono- and diglyceride and a solid phase ester emulsifier such as succinylated mono- and diglyceride, or the alkali or alkaline earth metal salt of an acyl lactylate.

7 Claims, No Drawings

HYDRATED STABLE FLUENT SHORTENING CONTAINING SOLID PHASE EMULSIFIER COMPONENTS

The present application is a continuation-in-part of prior application Ser. No. 747,296, filed Dec. 3, 1976, assigned to assignee of the present application, now U.S. Pat. No. 4,137,338.

The present invention relates to a novel hydrated fluid shortening.

BACKGROUND OF THE INVENTION

Fluid shortenings are useful in the preparation of baked goods and in bread-making processes. The function of a fluid shortening is similar to that of a plastic shortening in baking processes, but fluid shortenings are much preferred for use in commercial baking processes due to their ease in handling, pumping, and metering.

In prior U.S. Pat. No. 3,943,259, to Max E. Norris and assigned to assignee of the present application, there is disclosed a fluid shortening which contains (as emulsifier components) by weight about 4 to 14 parts of soft mono- and diglycerides, 2 to 8 parts of ester emulsifier, 0 to 8 parts of solid stearine, in at least about 40 parts of liquid vegetable oil. The fluid shortening is a stabilized dispersion of the emulsifier components in the vegetable oil and is produced by melting a blend of the components at temperatures sufficient to force a melt, votating the blend at temperatures of about 82° to 86° F., and then stehling the votated mixture to obtain substantially 100 percent conversion to the stable beta-polymorphic form. The fluid shortening of this patent has the advantage, among others, that it possesses a stabilized fluid consistency the viscosity of which remains relatively constant over a wide temperature range.

One problem is that it may be desirable in certain instances to save on shipping costs by shipping only the emulsifier components and other shortening ingredients absent the vegetable oil to a point of further processing where such components or ingredients then may be blended into the vegetable oil. Such different points of further processing, however, may not possess the stehling equipment and capabilities necessary to permit further processing.

In copending application Ser. No. 747,296, there is disclosed an emulsifier concentrate which is stable and can be stored and shipped, and which at the same time can be readily blended with a liquid edible oil, such as a vegetable or animal derived oil, to provide a fluid shortening. The blending can be by mere mechanical mixing, and the resultant shortening, because of the unique character of the concentrate, was found to be exceptionally stable. No stehling of the blend was required. Thus it is possible to ship the emulsifier to a remote location, blend it with a locally available vegetable oil, and save on substantial shipping costs. The emulsifier concentrate which, when blended with a liquid vegetable oil, or when added directly to a comestible mixture, provided all of the functionalities normally required of a shortening.

It is known to provide an emulsifier concentrate having more than one emulsifying ingredient, as different emulsifiers have different functionalities. U.S. Pat. No. 3,785,993, to Roy Kenneth Langhans, discloses a clear emulsifier composition said to be useful for yeast-raised products. The composition comprises a glycerol partial ester as a softener, a polyoxyethylene ester of a glycerol, hexitol, hexitan or isohexide as a conditioner, and propylene glycol, water, ethanol or an edible oil as a clarifying agent. The patent does not disclose or suggest the preparation of a fluent emulsifier suspension or concentrate which has a solid phase emulsifier component therein. A similar disclosure is contained in Langhans U.S. Pat. No. 3,859,445.

U.S. Pat. No. 3,180,736, to Bert W. Landfried, discloses an emulsifier composition containing mono- and diglycerides combined with a fatty acid lactylate. In an example, stearyl-2 lactylic acid was melted with glyceryl mono stearate at a temperature of 70° C., and water at 50° C. was then added to the melt and stirred to form an oil and water emulsion. This was cooled to become a firm plastic solid. The patent does not suggest nor teach the preparation of a fluent concentrate.

U.S. Pat. No. 3,870,799, to Ralph J. Tenney, teaches the preparation of a hydrated admixture containing 20–80% water, an alkali or alkaline earth metal salt of the acyl lactylates of $C_{14}$–$C_{22}$ fatty acids and ethoxylated mono- and di-glycerides of the $C_{14}$–$C_{22}$ fatty acids. It is indicated that these admixtures are prepared by heating the acyl lactylate salts and the ethoxylated mono- and di-glycerides at 60° C. until the lactylate salts melt followed by addition of 60° C. water and cooling to form a plastic solid. As with U.S. Pat. No. 3,180,736, there is no suggestion nor teaching in this patent of the preparation of a fluent concentrate.

It is also well known to hydrate lipoidal materials for use in edible comestibles such as bakery goods, e.g., cakes, bread and rolls. Hydrating of certain lipoidal emulsifiers with from about 35% to 75% water activates the emulsifier increasing its surface active properties. One type of emulsifier which has been successfully hydrated is polyoxyethylene sorbitan or mannitan esters obtained by condensing ethylene oxide with sorbitan or mannitan esters. Monoglycerides as well as glycol esters, e.g., propylene glycol monostearate, in combination with fat are typical of other emulsifiers which have also been hydrated.

In prior U.S. Pat. No. 3,671,459, also assigned to assignee of the present invention, there is disclosed the effectiveness of including in an edible hydrated emulsifier component at least about 30% by weight, based on the lipoidal component, of an edible alkoxylated partial fatty acid ester.

BRIEF SUMMARY OF THE INVENTION

The present invention resides in the discovery that the emulsifier concentrate of copending application Ser. No. 747,296, which comprises a normally liquid or soft partial glycerol ester food emulsifier vehicle having stably dispersed therein ethoxylated fatty acid esters and solid phase fine crystalline food emulsifier components, said concentrate being mechanically dispersed into a vegetable oil to produce a fluid shortening blend, can be readily hydrated by emulsification of the shortening into about 75% to about 45% water (based on the total weight of the emulsion).

By "stably dispersed", it is meant that the solid phase emulsifier components remain at least in part in suspension and in solid phase in the partial glycerol ester vehicle, whereas the ethoxylated fatty acid esters may or may not be in suspension. That is, they may be in whole or in part dissolved in the emulsifier vehicle.

In a particular embodiment of the present invention, the fluid concentrate is mechanically dispersible into an edible oil, such as a vegetable or animal derived oil, in the preparation of a fluid shortening suitable for bread and dough mixes providing improved anti-staling and dough conditioning properties.

More specifically, the fluid shortening of the present invention comprises on a weight basis about 40 to about 70 parts of a liquid vegetable oil and about 8 to about 29 parts of an emulsifier fraction or concentrate consisting essentially of about 4 to about 10 parts normally liquid or soft partial glycerol ester food emulsifier vehicle into which is stably dispersed about 2 to about 8 parts ethoxylated fatty acid ester, about 2 to about 8 parts solid phase fine crystalline food emulsifier component, and about 0 to about 3 parts soybean stearine; blended with water in the proportion of about 25–55% shortening to about 75–45% water.

Preferably the solid phase ester emulsifier is a succinylated mono- and diglyceride or alkali or alkaline earth metal salt of an acyl lactylate. Preferred glycerol ester vehicles are a fluent monoglyceride such as glycerol monooleate, or a soft mono- and diglyceride.

DETAILED DESCRIPTION OF THE PRESENT INVENTION

The liquid (fluent) or soft partial glycerol esters useful in accordance with the concepts of the present invention include both pure monoesters of glycerin and mixtures of monoesters and diesters of glycerin. They are generally a mixture of unsaturated and saturated glycidyl esters of fatty acids typically derived from hydrogenated and non-hydrogenated vegetable oils such as soybean oil, corn oil, olive oil, peanut oil, safflower oil, cottonseed oil, palm oil and like vegetable oils, and animal fats such as tallow and lard. The ratio of monoglycerides to diglycerides in conventional mono- and diglycerides typically is about 40 to 60 weight percent monoglyceride to about 35 to 45 weight percent diglyceride and minor amounts of 5 to 14 percent triglycerides. They have an iodine value in the broad range of about 40 to 150 although the mono- and diglycerides derived from vegetable oils preferably have an iodine number between about 65 to 150. The preferred iodine number range of the mono- and diglycerides is between about 40 and 85. They are fluid or soft in consistency. The acid number of the mono- and diglycerides is less than 2 and the peroxide value should be less than 1 in accordance with conventional specifications of mono- and diglycerides commercially available.

Specific mono- and diglycerides within the scope of the present invention include glycerol monooleate (GMO). One glycerol monooleate useful in the present invention is "Emrite 6009", trademark Emery Industries, comprising mono- and diglycerides of food grade oleic acid said to have an iodine value of at least 60, at least 46% α-monoglyceride, less than 7% free glycerine, and 9.5% propylene glycol. A similar glycerol monooleate is marketed by ICI United States, Inc. under the trademark "Atmos 300" said to contain about 12% propylene glycol. Preferably about 8–12% propylene glycol is present in the partial glycerol ester component.

A suitable mono- and diglyceride useful in the present invention is Dur-em 204 (trademark, SCM Corporation) containing 52% minimum α-monoglyceride. This emulsifier has an I.V. of 65–75 and a Capillary Melting Point of 120°–130° F. This mono- and diglyceride is sold in the form of a cream plastic.

The class of ethoxylated fatty acid esters useful in the concentrate of the present invention are the ethoxylated fatty acid esters of glycerol, hexitol, hexitan and isohexide, as well as the fatty acid esters of ethoxylated glycerol, hexitol, hexitan and isohexide. A preferred class of compounds for use in the concentrate of the present invention are the ethoxylated mono- and diglycerides, which are the polyethoxylated fatty acid esters of glycerol, and may be conventionally described as a mixture of stearate, palmitate, and lesser amounts of myristate partial esters of glycerin condensed with about 18 to 22 moles, preferably about 20 moles, of ethylene oxide per mole of α-monoglyceride reaction mixture such as set forth in The Food Codex and FDA Regulations, and more particularly as set forth in the Egan patent, U.S. Pat. Nos. 3,433,645, incorporated herein by reference. The fatty acid radicals of ethoxylated monoglycerides preferably are higher fatty acid chains having about 12 to 18 carbon atoms.

Representative fatty acid mono- and diesters of glycerin from which the ethoxylated monoglycerides are derived are glycerol monostearate, glycerol distearate, glycerol monopalmitate, glycerol dipalmitate, glycerol monooleate, glycerol dioleate, and others.

One suitable ethoxylated mono- and diglyceride that may be employed in the present invention is Durfax EOM (Trademark) marketed by Glidden-Durkee Division of SCM Corporation. This emulsifier is manufactured from hydrogenated vegetable oils, is sold as a cream plastic, and has an acid value maximum of 2.0, an hydroxyl value of 65–80, an IV number based on fatty acid content of 3 maximum and an oxyethylene content of 60.5–65.0%.

Preferably, the ethoxylated monoglycerides for this invention have an hydroxyl value of about 65 to 80, a saponification number of about 65 to 75, acid values less than about 2, and an oxyethylene content of about 60 to 65 weight percent based on the total ethoxylated glycerides composition. The capillary melting point of ethoxylated mono- and diglycerides is between about 75° to 95° F. and preferably between about 80° to 90° F. Ethoxylated monoglycerides may be prepared by reacting ethylene oxide with a mono- and diglyceride mixture at temperatures of about 125° to 175° C., such as suggested in the Egan patent, U.S. Pat. No. 3,490,918, and incorporated herein by reference.

Representative of other polyoxyethylene-containing fatty acid esters useful in the present invention are the polysorbates (polysorbate 60) such as polyoxyethylene sorbitol distearate, polyoxyethylene sorbitan monostearate, polyoxyethylene isosorbide monopalmitate, polyoxyethylene sorbitan distearate, polyoxyethylene isosorbide monooleate, polyoxyethylene sorbitol, trilaurate, polyoxyethylene sorbitan dibehenate, polyoxyethylene isosorbide monolinoleate, polyoxyethylene sorbitan monolaurate, ethoxylated propylene glycol monoesters, polyoxyethylene mannitan monooleate, polyoxyethylene sorbitan monopalmitate, polyoxyethylene sorbitol oleate, as well as other similar ethoxylated fatty acid esters of ethoxylated hexitols, hexitans, and isohexides.

The solid phase crystalline food emulsifier component can be any beta-forming emulsifying ingredient which remains in whole or in part suspended and in solid phase form in the glycerol monooleate, in the presence of the ethoxylated fatty acid esters, in the proportions as defined herein. For purposes of the present application, the term "beta-forming" describes the predominant crystal form adopted by the solid phase component on rapid chilling of the concentrate system from a melt form at an elevated temperature, followed by agitation for a prolonged period of time to develop and maintain a homogeneous dispersion of the desired beta-crystals in the fluid concentrate, in accordance with techniques known in the art.

Examples of functional solid phase fine crystalline food emulsifier components, which are beta-forming, are an alkali or alkaline earth metal salt of an acyl lactylate, or alternatively a succinylated mono- and diglyceride. The fatty acid lactylates and process for their manufacture are described in detail in U.S. Pat. No. 2,733,252, assigned to C. J. Patterson Company. The subject matter of this patent is incorporated by reference herein. Preferably, these compounds are the acyl lactylates of $C_{14}$-$C_{22}$ fatty acids. The two most common such compounds are sodium and calcium stearoyl-2-lactylate, known as "Emplex" and "Verv" (Trademarks) marketed by C. J. Patterson Company. Both are described in the Food Chemicals Codex, Second Edition, 1972 (National Academy of Sciences, Washington, D. C.) on pages 160 and 770, and can be prepared by admixing lactic acid in an aqueous medium with commercial stearic acid (an admixture of myristic, palmitic and stearic fatty acids) at a sufficiently elevated temperature to cause a condensation reaction to occur. Other examples of the sodium stearoyl-2-lactylate are "Artodan SP 50" marketed by Grinstead Corp. and "Stearolac S450" marketed by The Paniplus Company. Specific procedures for producing the lactylates, of which the number 2 indicates the average number of lactyl groups on the molecule, are set forth in U.S. Pat. No. 2,789,992, insofar as the sodium stearoyl-2-lactylate ester is concerned, and the aforementioned U.S. Pat. No. 2,733,252, which describes both the preparation of sodium stearoyl-2-lactylate from stearic acid, sodium hydroxide, carbonate or bicarbonate and lactylic acid, and also sets forth the parameters for the production of the calcium lactylate composition. The disclosures of the "Food Chemicals Codex" publication and the U.S. Pat. No. 2,789,992 are also incorporated by reference herein.

Particular reference can be had to the Food and Drug Administration Regulation Title 21, Section 121.1211, on sodium stearoyl-2-lactylate. This compound is said to be a mixture of sodium salts of stearoyl lactylic acid and minor proportions of other sodium salts of related acids, manufactured by the reaction of stearic acid and lactic acid and conversion to the sodium salts. This emulsifier meets the following specifications:
Acid Number: 60-80
Sodium Content: 3.5%-5%
Lactic Acid Content: 31%-34%
Ester Number: 150-190

The manufacture of succinylated mono- and diglycerides is disclosed in U.S. Pat. No. 3,370,958, assigned to National Dairy Products Corporation, incorporated by reference herein. These compounds are also described in Food and Drug Administration Regulation, Section 121.1197. It is stated that they are a mixture of half succinic acid esters of mono- and diglycerides produced by the succinylation of a product obtained by the glycerolysis of edible fats and oils or by the direct esterification of glycerol with edible fat-forming fatty acids. They have a succinic acid content of 14.8 to 25.6%, a melting point of 50° C. to 60° C. and an acid number of 70-120.

The advantage of the present invention is that the foregoing emulsifiers can be mixed together to make a stable concentrate, and then shipped to a remote location for blending with an edible oil and water to make the shortening of the present invention. For this purpose, the concentrate preferably contains about 10% to about 70% glycerol ester and about 90-30% of other emulsifier components including the solid phase ester emulsifiers. A preferred formulation comprises about 10 to about 70 weight percent liquid partial glycerol ester, about 15 to about 72 weight percent ethoxylated fatty acid ester, and about 4 to about 54% normally crystalline food emulsifier. The ratio of solid phase ester emulsifier to ethoxylated fatty acid ester preferably does not exceed about 1.5, the proportions being such as to produce a fluent cloudy suspension. By "fluent" it is meant flowable or pumpable. By "cloudy" it is meant other than clear. In the case of the use of an acyl lactylate salt, the ratio of such salt to ethoxylated fatty acid ester should not exceed about one. A preferred formulation comprises about 40% glycerol monooleate vehicle in which is suspended and dissolved 30% sodium stearoyl-2-lactylate and about 30% ethoxylated mono- and diglyceride, to provide a cloudy, viscous but flowable or pumpable concentrate.

Another suitable formulation in accordance with the concepts of the present invention comprises about 10% glycerol monooleate vehicle in which is suspended or dissolved about 45% ethoxylated mono- and diglyceride and about 45% succinylated mono- and diglyceride.

Preferably, the emulsifier concentrate is processed by physically, uniformly blending the respective emulsifier components at about 130-150° F., sufficient to liquefy all of the components, using a high speed mixer. The concentrate is then subjected to rapid indirect chilling or nucleating to initiate beta-crystal formation within the concentrate, and then is mildly agitated and mixed following known procedures or techniques to permit the substantially complete development of the desired beta-crystal form of the beta-phase forming emulsifier component.

In a preferred procedure. the concentrate is subjected to quick chilling in a swept-surface heat exchanger such as a Votator "A" type unit chilling machine as described in detail in U.S. Pat. No. 3,011,896. The primary function of the Votator "A" unit is to quick-chill the concentrate to initiate the formation of beta-crystals. The chilled blend is then passed to a Votator "B" unit wherein the blend is mildly agitated or worked to produce a product of desired consistency. The primary function of the "B" unit is to allow the beta-crystallization to further develop. The exit temperature of the "B" unit should be maintained between about 70° F. and about 100° F. As the "B" unit has no cooling capability, the "A" unit exit temperature is maintained in whatever range is necessary to achieve the desired "B" unit exit temperature.

Following votation, the resulting stable fluent concentrate is subjected to a prolonged mild agitation for an extended period to achieve substantially complete conversion to or development of the beta-crystal form, on the order of at least 90% conversion, and preferably 95 to 100% conversion. This agitation may be carried out for a period of from about 18 to 48 hours, and is carried out at a temperature in the range of about 70-100° F., preferably ambient temperature or about 75-85° F. The agitation may, if desired, be carried out in a jacketed kettle through which a coolant (e.g., tap water) is circulated to effect the purpose of abstracting heat generated by the mechanical agitation and crystallization of the mass. One suitable jacketed vessel is known as a stehling tank.

Following prolonged agitation, the concentrate may be stored, added directly to a comestible mixture such as bread dough, or physically blended with an edible oil and water to produce a stable hydrated shortening using a high speed mixer. Alternatively, the concentrate can be blended with an edible oil and water using a swept-surface heat exchanger such as the Votator "A" and Votator "B" units described above, the "A" unit having an exit temperature of 65°–75° F., the "B" unit having an exit temperature of 70°–80° F. Votation has the advantage that it reduces the crystal size of the lipid components enhancing physical stability and handling characteristics, and also yielding a homogeneous blend.

The following Examples illustrate use of the shortening of the present invention in the preparation of bread. It is, of course, understood that the concentrate has applications as an emulsifying agent other than bread, although a principal utility is in the preparation of bread and other yeast-raised products. Edible oils that the concentrate can be mixed with include vegetable and mineral oils. All hydrogenated vegetable oils conventionally used in the preparation of liquid shortenings other than soybean oil can be employed.

After preparation of the bread mixes and baking, in the following Examples, the resulting bread loaves were evaluated using certain standard tests, namely: determination of specific volume in cubic centimeters per gram, the higher the specific volume the more desirable the bread; percent shock loss; bread score; and Instron Reading. The percent shock loss is a measurement of the percentage loss in specific volume when a proofed, unbaked loaf of bread is allowed to slide down a 3-roller conveyor tilted at an angle of 16.5° to a horizontal plane and to collide with a stopper at the bottom of the conveyor. Proofing bread refers to the process wherein unbaked bread is allowed to stand for approximately one hour at 100° F., relative humidity of 85–100%, and to rise. The lower the percentage of shock loss the more desirable is the bread. Bread score is an overall evaluation of a baked load of bread wherein a number is assigned to the bread, with 100 being a perfect score, 80 or lower being unacceptable, 90 being good to excellent. In determining the bread score, consideration is given to the texture of the bread, cellular structure of the crumb (uniformity), break and shred, flavor, odor, taste, volume in cc./gram, and color. The Instron test is a procedure for measuring bread softness or staling at spaced intervals and is conducted on a table model Instron Unit coupled with a strip chart recorder and an integrator. The CB Censor Cell of the Instron has a load range of 0–2000 grams, and the aluminum cylindrical probe was 3 centimeters by 2.5 centimeters. The test sample was produced by placing a test loaf into a bread slicing miter box with slots and slicing the test loaf into 2-inch sections. Softness measurements were conducted on two segments of each loaf which adjoin the center slice in the direction of the closest end. The integrator reading was reported by compressing the crumb to a depth of 0.5 inch at a crosshead rate of 0.5 inch per minute with the probe positioned approximately at the center of the slice and exactly on the testing surface. A value E was obtained as a relative measure of softness of the bread wherein higher values of E reflect a firmer bread product. E is a unit of work or energy calculated from the following formula:

$$E = X/5000 \, L \, S$$

wherein
E = the energy in inch gram
L = the full-scale load in grams
S = the rate of compression
X = the integrated value.
Smaller values of E indicate less staling of the bread.

In this application, the following abbreviations may be employed:

EOM = ethoxylated mono- and diglycerides
GMO = glycerol monooleate
SSL = sodium stearoyl-2-lactylate
SMG = succinylated mono- and diglycerides.

EXAMPLE 1

A fluid shortening was produced having the following components:

TABLE 1

| | |
|---|---|
| Refined soybean oil | 81.45% |
| Mono- and diglycerides (50% minimum α-mono-diglyceride, Dur-em 204) | 6.50% |
| Ethoxylated mono- and diglycerides (Durfax EOM) | 4.90% |
| Sodium stearoyl-2-lactylate (Emplex) | 4.90% |
| Soybean stearine | 2.25% |

The emulsifier ingredients (minus the soybean oil) were charged into a holding tank and heated to a temperature in the range of about 130° to 150° F. and agitated at this temperature until a molten mixture was obtained. The ingredients were then subjected to quick chilling in a Votator "A" unit having an exit temperature in the range of about 80°–90° F., the chilling being at a rate sufficient to initiate beta-crystallization. The mixture was then subjected to mild agitation in a Votator "B" unit, having an exit temperature of 70°–100° F., to promote further beta-crystallization. Following this, the ingredients were subjected to prolonged agitation (stehling) at a relatively constant temperature, between about 70°–100° F., until beta-crystallization was substantially complete. The stehling time was 18 to 48 hours.

Subsequent to manufacture of the concentrate, the ingredients were again charged into a holding tank, mixed with the soybean oil, and heated to a temperature of about 140° to 145° F. and agitated at this temperature until a molten mixture was obtained. To this mixture was added water in the proportion of about 60% water to about 40% shortening of Table 1. Mixing was conducted using a high speed mixer, after which the emulsified mixture was then pumped to a first Votator unit "A" wherein the mixture was rapidly cooled to a chilled blend. The exit temperature of the Votator unit "A" was 65° to 75° F. The mixture was then pumped into a Votator "B" unit where it was maintained at 70° to 80° F. with mild agitation to produce a stabilized uniform dispersion. Holding time of the chilled blend within the Votator "B" unit was about one minute.

The hydrated fluid shortening had a stable viscosity profile with regard to time and temperature, providing good handling porperties.

Alternatively, the water, emulsifier and oil may be stably blended by physically mixing the ingredients using a conventional high speed mixer.

EXAMPLE 2

The fluid shortening of Example 1, Table 1, was mixed with varying proportions of water (by height) and the stability and viscosity of the resulting mixture was ascertained. Processing of the hydrated mixture was as in Example 1.

TABLE 2

| % Shortening Example 1 | % Water | Stability | Viscosity (cps) Initial | One Week |
|---|---|---|---|---|
| 90 | 10 | non-stable | 650 | non-stable |
| 80 | 20 | " | 700 | " |
| 70 | 30 | " | 6400 | 6650 |
| 60 | 40 | " | 2000 | 5400 |
| 50 | 50 | stable | 840 | 1950 |
| 40 | 60 | " | 350 | 760 |
| 30 | 70 | " | 380 | 410 |
| 20 | 80 | non-stable | 120 | 110 |
| 10 | 90 | " | 20 | 50 |

A range of acceptable hydrates is seen to be about 55/45 to about 25/75 parts shortening to water, respectively.

EXAMPLE 3

Three hydrate systems, 50/50, 40/60 and 30/70 parts of shortening to water, were evaluated in a continuous mixed bread by adding to a brew formula as follows:

| Brew: | 2.00 pounds | granulated sugar |
|---|---|---|
| | 2.00 pounds | salt |
| | 3.25 pounds | yeast |
| | 0.75 pound | yeast food |
| | 3.00 pounds | shortening, Example 1 |
| | 68.75 pounds | water |
| | 15/60 ppm | KIO₃/KBrO₃ |
| | 0.10 pound | sodium propionate |
| Spike: | 2.00 pounds | high heat milk solids |
| | 5.00 pounds | sugar |

The brew was continuously mixed and pumped to deliver 3.0% of shortening basis flour into the final bread. No foaming was encountered during a two-hour continuous mix bread run. Table 3 indicates the results of test evaluations on the bread products.

TABLE 3

| | Negative Control | Hydrate System 50/50 | 40/60 | 30/70 |
|---|---|---|---|---|
| Specific Volume, cc/gm | 6.61 | 6.84 | 7.06 | 7.23 |
| Percent shock loss | 33.60 | 0 | 0 | 5.10 |
| Bread score | 85 | 93 | 96 | 95 |
| Instron-Day (in/gms) | | | | |
| 1 | 26.50 | 20.60 | 21.50 | 23.40 |
| 3 | 45.60 | 33.70 | 34.40 | 35.10 |
| 7 | 67.00 | 55.50 | 49.20 | 54.10 |

What is claimed is:

1. A temperature stable fluent shortening for yeast-raised products, to provide improved dough conditioning and anti-staling properties, consisting essentially of
    an emulsifier concentrate comprising a normally liquid or soft partial glycerol ester emulsifier having an Iodine Value in the range of about 40–150, an ethoxylated fatty acid ester emulsifier, a solid beta-phase crystalline food emulsifier, and optionally soybean stearine in the proportions of about 4–10 parts glycerol ester, about 2–8 parts ethoxylated fatty acid ester, about 2–8 parts crystalline food emulsifier, and about 0–3 parts stearine;
    said ethoxylated fatty acid ester emulsifier being an ethoxylated fatty acid ester of glycerol, polyglycerols, propylene glycol, hexitol, hexitan and isohexide, or a fatty acid ester of ethoxylated glycerol, hexitol, hexitan and iso-hexide.
    a liquid vegetable oil in the proportion of about 40–70 weight parts vegetable oil to about 8–29 parts emulsifier concentrate; and
    water, emulsified with said oil and emulsifier concentrate in the proportion of about 45–75% water to about 25–55% lipoidal materials.

2. The shortening of claim 1 wherein said solid beta-phase crystalline food emulsifier is selected from the group consisting of an alkali or alkaline earth metal salt of an acyl lactylate, and a succinylated mono- and diglyceride.

3. The shortening of claim 2 wherein said ethoxylated fatty acid ester emulsifier is selected from the group consisting of ethoxylated mono- and diglyceride, ethoxylaed sorbitan, ethoxylated mannitan, ethoxylated monooleate, ethoxylated propylene glycol monoesters, and ethoxylated triglycerol monostearate.

4. The shortening of claim 1 prepared by the steps of physically blending the concentrate ingredients at an elevated temperature sufficient to form a substantially homogeneous melt; cooling said melt to a temperature sufficiently low to initiate crystallization and then subjecting the same to mild agitation for a sufficient time and temperature to develop beta-crystallization; and then blending the oil and water with said concentrate.

5. The shortening of claim 1 prepared by the steps of
    establishing a melt of said solid beta-phase crystalline food emulsifier, said ethoxylated fatty acid ester emulsifier, and said normally liquid or soft partial glycerol ester emulsifier in the proportions stated;
    nucleating said melt by rapid, indirect cooling;
    subjecting the nucleated melt to mild agitation for a sufficient time and at a temperature to develop a stable concentrate of beta-phase crystals dispersed in partial glycerol ester emulsifier; and
    blending with said concentrate said liquid vegetable oil and water in the proportions stated.

6. The shortening of claim 1 wherein the blending of concentrate, vegetable oil and water is carried out by
    establishing a molten mixture of oil and concentrate;
    adding water to said molten mixture forming an emulsified mixture thereof; and
    nucleating said molten mixture by rapid, indirect cooling.

7. The shortening of claim 1 wherein said partial glycerol ester emulsifier is mono- and diglyceride.

* * * * *